United States Patent
Warmenhoven et al.

(10) Patent No.: US 8,700,799 B2
(45) Date of Patent: Apr. 15, 2014

(54) METHODS, DEVICES AND SYSTEMS WITH IMPROVED ZONE MERGE OPERATION BY OPERATING ON A SWITCH BASIS

(75) Inventors: Eric Andre Warmenhoven, San Jose, CA (US); Yi Lin, San Jose, CA (US); Sundar Poudyal, Pleasanton, CA (US); James Hu, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1920 days.

(21) Appl. No.: 10/987,441

(22) Filed: Nov. 12, 2004

(65) Prior Publication Data

US 2006/0168109 A1    Jul. 27, 2006

(51) Int. Cl.
*G06F 15/173*   (2006.01)

(52) U.S. Cl.
USPC .......................................... 709/238

(58) Field of Classification Search
USPC .......................................... 709/238
See application file for complete search history.

(56) References Cited

U.S. PATENT DOCUMENTS

| | | | |
|---|---|---|---|
| 5,598,530 A | 1/1997 | Nagae | |
| 7,885,256 B1 * | 2/2011 | Yenamandra et al. | 370/389 |
| 2003/0076794 A1 | 4/2003 | Kawasaki et al. | |
| 2003/0163727 A1 * | 8/2003 | Hammons et al. | 713/201 |
| 2004/0024906 A1 | 2/2004 | Valdevit | |
| 2005/0281196 A1 * | 12/2005 | Tornetta et al. | 370/235 |
| 2006/0039385 A1 | 2/2006 | Bare et al. | |
| 2006/0117096 A1 | 6/2006 | Lin et al. | |
| 2006/0117112 A1 | 6/2006 | Lin et al. | |
| 2006/0136780 A1 | 6/2006 | Meng et al. | |
| 2006/0168265 A1 | 7/2006 | Bare et al. | |

OTHER PUBLICATIONS

Desanti, Claudio, "MRRA and Zoning", Dec. 6, 2002, p. 1-3.*
"Fibre Channel Switch Fabric—2 (FC-SW-2) Rev 5.3;" Chapter 10; NCITS working draft proposed American National Standard for Information Technology; Jun. 26, 2001.
"Fibre Channel Switch Fabric—3 (FC-SW-3) Rev 6.6;" Chapter 10; NCITS working draft proposed American National Standard for Information Technology; Dec. 16, 2003.
"Fibre Channel Switch Fabric—4 (FC-SW-4) Rev 7.0;" Chapter 10; INCITS working draft proposed American National Standard for Information Technology; Jul. 23, 2004.

* cited by examiner

*Primary Examiner* — Ryan Jakovac
(74) *Attorney, Agent, or Firm* — Wong, Cabello, Lutsch, Rutherford & Brucculeri, L.L.P.

(57) ABSTRACT

Methods, devices and systems for improved zone merge operations are disclosed. Two connected switches are arbitrated as an initiator and a receiver. The merge operation is initiated only by the initiator on an initiator/receiver inter-switch link. The initiator may initiate a merge request and the receiver may perform the computation of the difference between the old and the new zone. Either the whole configuration or only the differences are communicated between the switches. The merges may be done on a connected switch basis, not on a connected port basis. Only the principal ports in the principal inter-switch-link perform the merge operation. All the remaining ports, i.e. the non-principal ports, adopt the merge result of the principal ports. The zone information may also be cached on each switch such that merge calculations need not be performed again when a merge operation with the same configuration occurs in the future.

10 Claims, 8 Drawing Sheets

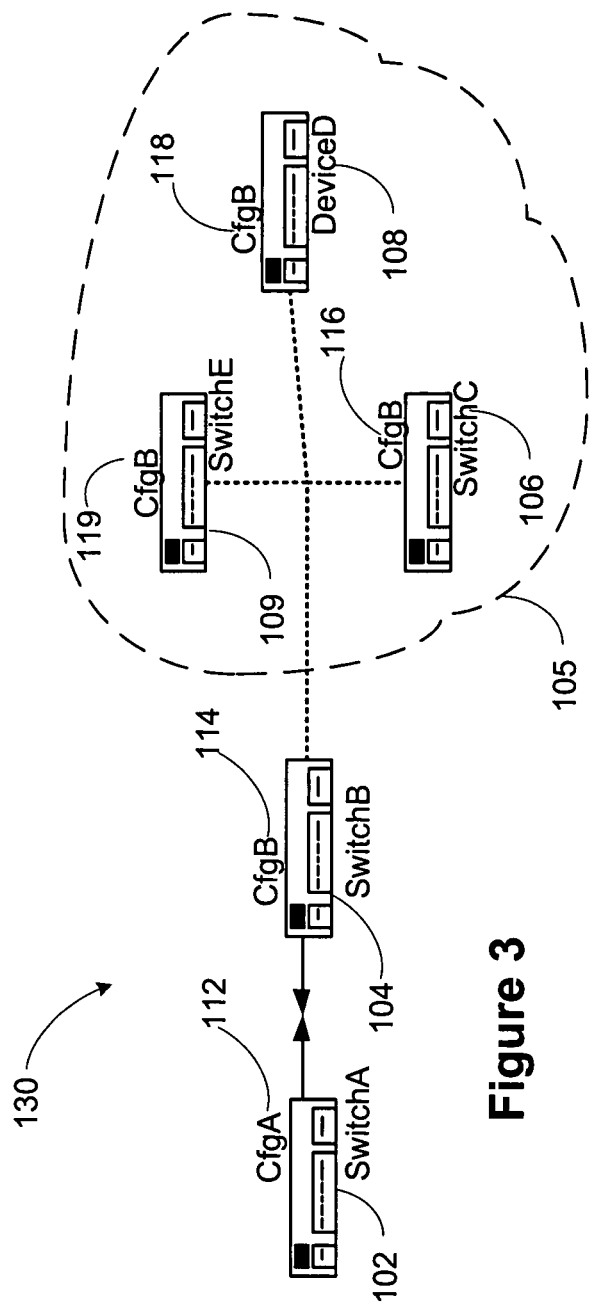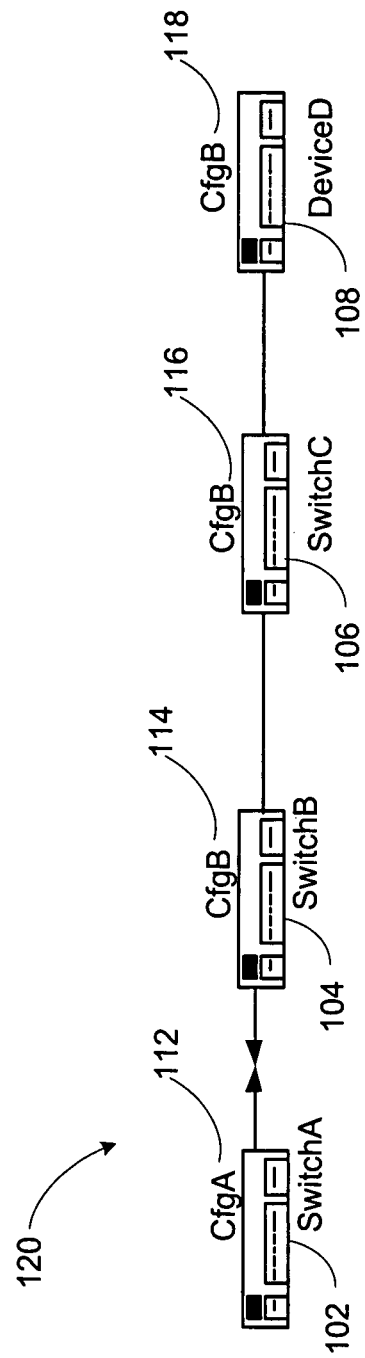
Figure 3
Figure 4

METHODS, DEVICES AND SYSTEMS WITH IMPROVED ZONE MERGE OPERATION BY OPERATING ON A SWITCH BASIS

CROSS-REFERENCE TO RELATED APPLICATIONS

This case is related to U.S. patent application Ser. No. 10/988,180, entitled "Methods, Devices and Systems with Improved Zone Merge Operation by Initiator Selection," by Yi Lin, Eric Warmenhoven, Sundar Poudyal and James Hu, filed concurrently herewith and Ser. No. 10/988,172, entitled "Methods, Devices and Systems with Improved Zone Merge Operation by Caching Prior Merge Operation Results," by Yi Lin, Eric Warmenhoven, James Hu and Sundar Poudyal, filed concurrently herewith, both of which are hereby incorporated by reference.

BACKGROUND OF THE INVENTION

1. Field of the Invention

This invention relates to an electronic network and its operation, more specifically to a zone merge operations within such a network.

2. Description of the Related Art

The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications.

A Fibre Channel network may consist one or more fabrics. A fabric is an entity that interconnects various ports attached to it and is capable of routing frames using only the D_ID information in an FC-2 frame header. A fabric may have zones to facilitate network management and operation. A zone is a group of zone members, where members of a zone are made aware of each other, but not made aware of other devices outside the zone. A zone can be defined to exist in one or more zone sets. Each zone has a zoning configuration, which includes a zone definition and a zone set state. The zone definition contains parameters that define a zone, including zone name, number of zone members and zone member definitions. The zone member definition contains parameters that define a zone member including the zone member type and zone member information. The zone set state is the state of a switch zone set (activated or deactivated).

When two fabrics are joined together, i.e. at least one switch in one fabric is connected to at least another switch in the other fabric, if zoning is present, then the two switches will attempt to merge their zoning information to ensure the zoning information is consistent across the joined fabric. The performance of the merge operation directly affects the processing time needed to allow the whole fabric to return to stable state as well as the overall performance of the switches during the merge operations.

The interface on a switch that connects to another device is a port. There are many different ports depending on the network topology and the type of devices that they are connecting. The port on a switch that connects to a port on another switch is an E_port. A port on a switch that connects to an end node is an F_port. The current invention is directed to the merge operation between switches, so only E_ports will be discussed.

FIG. 1 shows a small part of a Fibre Channel network 100, where a switch 102 is connected to another switch 104. SwitchA 102 has a zone configuration 112 cfgA and switchB 104 has a zone configuration 114 cfgB. Each switch 102, 104 has a checksum associated with the zone configuration. A zone configuration may have a size between several kilobytes to many megabytes depending on the switch or fabric configurations. In the examples discussed below, a zone configuration often runs to hundreds of kB. A checksum is typically much smaller, significantly less than 1 kB. A checksum acts as a shorthand or identifier for a particular configuration. In the same examples, a checksum is 32 bytes.

A merge computation performs a union of the two configurations in:

$$cfgR = cfgA \cup cfgB \qquad (1)$$

A simplified merge exchange is illustrated in FIG. 2 between switches 102 and 104. It is simplified in that it does not show all the transactions that may happen when two switches are connected. For example, FIG. 2 does not show many merge requests sent from switchB 104 to switchA 102; it does not show any possible Rejects because of busy conditions; and it does not show any possible retries as well.

A merge exchange includes several steps. Using FIG. 2 as a simplified example, the merge exchange may occur as follows. Assuming switchA 102 initiates the merge operation, switchA 102 sends a checksum request to switchB 104 (Req1) and switchB 104 sends a response back, which is its own checksum (Res1:ACC). SwitchA 102 compares the checksum received from switchB 104 with its own. If they are different, switchA 102 sends out an MR request with cfgA (Req2: MERGE). SwitchB 104 responds with cfgB in acknowledgement (Res2:ACC). SwitchB 104 computes ΔB cfgMerge(cfgB, cfgA) and installs the entries of ΔB. Then switchB 104 has a new configuration cfgR with a new checksum associated with the new configuration cfgR. When switchA 102 gets the response of cfgB, it also does a merge computation ΔA=cfgMerge(cfgA, cfgB) and installs the entries of ΔA. SwitchA 102 now has cfgR. After this, the merge initiated from switchA 102 finishes. SwitchB 104 also attempts or initiates a merge by sending checksum request (Req3: CHECK). SwitchA 102 responds back (Res3:ACC), which is switchA's 102 new checksum associated with the new cfgR. Since switchB 104 has the same cfgR after the merge operation which was initiated by switchA 102 and the same checksum, the checksums match. So the merge initiated from switchB 104 finishes.

As will be discussed below, in the above merge operation, there are many duplicate operations and unnecessary data transmissions in the network. It is desirable to perform the merge operation more efficiently.

When a switch 102 is connected to a network of several switches 104, 106, 108 and 109 as shown in FIG. 3 or FIG. 4, the merge operation may be more complicated and time consuming. In this case, switchA 102 and switchB 104 merge first in the same way as shown in FIG. 1 and discussed above. SwitchA 102 does cfgMerge (cfgA, cfgB), and switchB 104 does cfgMerge (cfgB, cfgA). Both switches have cfgR as a result. SwitchB 104 broadcasts this to switchC 106. Since the configuration on switchB 104 changes, there will be a merge operation between switchB 104 and switchC 106. SwitchB 104 does cfgMerge (cfgC, cfgB) and switchC 106 does cfgMerge (cfgB, cfgC). The same chain of events will propagate further down the path until every pair of connected switches have the same configuration. If one counts the merge exchanges, one can find three merge exchanges, and a total of six merge computations when switchA 102 is connected to the fabric comprising switchB 104, switchC 106 and device DeviceD 108, in the simple example shown in FIG. 4. There are more merge exchanges and merge computations for a more complicated configuration such as shown in FIG. 3, because of more connected pairs of switches. However, as will be discussed below, many of the operations are unnecessary. It is desirable to improve the merge operation.

Merge operations are typically performed on a connected port basis. If more than one pair of ports on two switches is connected, as shown in FIG. 5, each pair of ports will perform merge operations, even though the merges are the same for each pair. FIG. 5 shows an example where different numbers of pairs of ports are connected between switches within a fabric. In the example shown in FIG. 5, switchA 102 and switchB 104 have four (4) pairs of ports connected, i.e. links between ports 121 and 131, ports 123 and 133, ports 125 and 135 and ports 127 and 137. SwitchB 104 and switchC 106 have one pair of ports 136 and 144 linked. SwitchC 106 and deviceD 108 have two pairs of ports linked, ports 156 and 145, and ports 158 and 147. In FIG. 5, a few details of the network deviceD 108 and switchC 106 are shown. The network deviceD 108 has a network interface 156 containing ports 152 and 154 which are capable to connect to ports on other network devices, such as switchC 106. Within the deviceD 108, there is a control module 158 which is coupled to the network interface and controls the operation of the deviceD 108. The control module 158 is also coupled to a memory module 157 which stores operation data or device information, such as configuration data 159. DeviceD can be any entity within a network. Similarly, switchC may have several ports 141-148, a control module and a memory module. In the fabric shown in FIG. 5, some of the pairs may be trunked, i.e. they act as a single logical link, e.g. links 156-145 and 158-147 may be trunked as if they were a single link. When port 121 and port 131 are connected, both of them initiate merge operations as discussed above. When the other pairs of ports are connected between switchA 102 and switchB 104, when the links are not trunked, each of them will perform a merge operation again, even though the merge results are already known from the earlier merge between port 121 and port 131. Therefore, it is desirable to have a method or devices that can avoid the wasteful operations.

When two switches are connected, both switches will initiate a merge operation. They are likely to initiate at approximately the same time. The result is that both merge requests will be rejected with a reason of LOGICAL_BUSY. If not treated specially, both switches would wait for the other side to initiate a merge, thus missing the initial MERGE. The default waiting time is different for different switches. So after some waiting time, one switch will try again to initiate a merge request and not getting a rejection. It is desirable to avoid the waiting time.

As discussed above, the current merge operation may have redundant merge computations, redundant merge exchanges, unnecessary merge retries across the fabric and extra waiting time. These inefficiencies make the merge operation prolonged and the fabric wait a longer time to be stable. It is desirable to have a method, a device and a system that make merge operations more efficient.

BRIEF SUMMARY OF THE INVENTION

According the embodiments of the present invention, the zone merge operation is improved.

In one embodiment, a port-based merge is changed to a switch-based merge. Only one merge is performed per connected-switch pair, which can reduce the redundant merges among ports connected to the same remote switch.

In another embodiment, two switches to be merged are distinguished as a merge initiator and a merge receiver by a switch specific identifier, for example by WWN arbitration. Only a merge initiator can initiate a merge operation and directs the merge calculation. This reduces the number of merge operations. This also avoids the waiting time caused by the conflicts between the two connected switches both trying to perform a merge operation.

In another embodiment, one switch transmits its whole configuration to the other switch. The other switch only transmits a configuration difference, or partial configuration, such that the overhead traffic of transmitting zoning configurations is reduced.

In a further embodiment, the checksums involved in past merge operations are cached in each switch. When a new merge operation is requested, the switch can check all the prior checksums. If the requesting checksum was used before, then the existing config will be the resulting config after the requested merge operation. Therefore, config will be used directly without the unnecessary merge calculation.

BRIEF DESCRIPTION OF THE SEVERAL VIEWS OF THE DRAWINGS

A better understanding of the invention can be had when the following detailed description of the preferred embodiments is considered in conjunction with the following drawings, in which:

FIG. 3 depicts a new switch merging into a group of connected switches.

FIG. 4 depicts a special topology of connected switches or other network devices, i.e. chained connection.

DETAILED DESCRIPTION OF THE INVENTION

Figure 2:
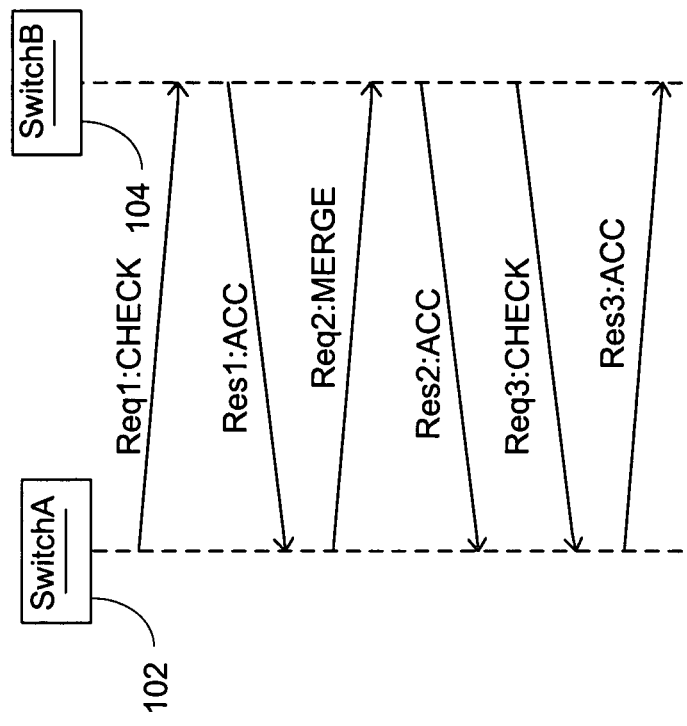
FIG. 2 depicts merge exchanges in the two switch scenario as shown in FIG. 1.

According to the embodiments of the current invention, many current and potential deficiencies in the merge operation are discovered, their sources identified and improvements made to eliminate such deficiencies.

According to one embodiment of the current invention, an enhanced zoning merge is implemented using an event driven state machine. A merge event dispatcher may be used. The merge event dispatcher listens to merge related events. On receiving a merge related event, a corresponding operation is initiated. The dispatcher first performs pre-dispatch checking to determine if the event needs to be handled asynchronously. If not, event is handled in context of the caller. Asynchronous events are scheduled for later dispatch. As long as there is a pending event on any E_port, the dispatcher feeds it to the port state-machine to advance it to a next state. When one port is DONE, it moves to the next one with pending events. If all ports are in DONE state merge is finished.

During a merge, communication between two switches is based on a "new merge exchanges" format. The new merge exchange is done by using port state-machine transition logic. Each port will be either an initiator or a receiver based on initiator/receiver arbitration. If a new zoning configuration is generated during the merge, the event dispatcher generates an event on the other ports (BROADCAST). The port state-machine may be expanded to include logic to handle a backward compatible mode or an interop mode, if desired.

The merger event dispatcher is responsible for: pre-dispatch checking and synchronous event handling; event dispatching; and driving port state-machine transitions.

Pre-dispatch checking: Zoning only handles one merge on one port at any time. Some merge requests can be rejected immediately in context of the source of the event. Pre-dispatch checking identifies events that could be handled synchronously. For example, if the dispatcher receives a merge request, pre-dispatch checks to determine if merge is already in progress. If so and the current "in process" port is same as the port associated with the incoming event, the dispatcher handles this event directly by rejecting the request with LOGICAL_BUSY.

Event dispatching: The dispatcher may dispatch the event to one port, or a group of ports. During dispatch, events are mapped to unified merge event types. The real dispatch process is simply associating an event with a corresponding port. For any port, only a pending event is possible. Dispatching replaces a current event at the port with a later one. If more than one event is pending, then pending events are put in a queue.

Driving the port state machine transition: The dispatcher is also responsible for feeding events into the port state-machine. Whenever there is a pending event on a port, the dispatcher feeds it into the port state-machine by a corresponding transition routine. When a port is done with the merge, and there are no pending events, the dispatcher moves to the next port. After all ports are processed, the dispatcher will be in idle mode until the next event.

According to an embodiment of the current invention, when an E_port comes ONLINE after it is connected to another port on another switch, it will be initialized as either the merge initiator or receiver. The role will be determined using a unique identifier or feature of the port. In one implementation, the WWN (World-Wide Name) of the switch is used as the unique identifier because it is unique in the network for each switch and convenient to use. Based on the WWN of a switch, an arbitrator determines a winner of the arbitration, which becomes an initiator and the loser is a receiver. By identifying two different roles for each switch in a connection, and allowing only the initiator to perform the merge operation, the redundant merge operation and conflicts are avoided.

According to this embodiment of the current invention, it is immaterial how the arbitrator assigns the two different initiator/receiver roles, or which role performs the whole or parts of the merge operation, as long as only one merge operation is performed between the two switches. One convenient arbitration rule is that the switch with the lower WWN becomes the arbitration winner, i.e. the initiator.

Figure 1:
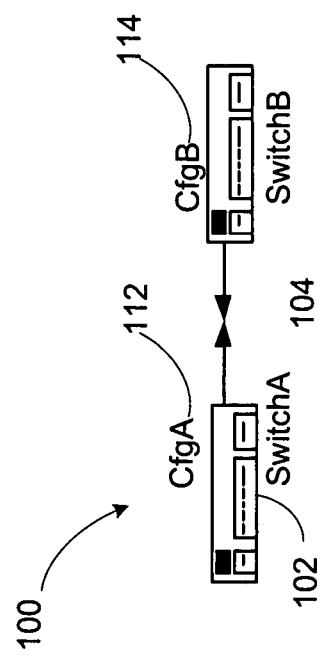
FIG. 1 depicts a two switch merge scenario in a network.

Refer back to the fabric shown in FIG. 1. Assuming switchA 102 wins the initiator/receiver arbitration, then switchA 102, which is now the initiator, can initiate the merge operation. SwitchB 104, which is now a receiver, cannot initiate the merge operation. Therefore, there can be no conflict caused by switchA 102 and switchB 104 initiating merge operation at the same time. The waiting time is thus eliminated. According to this embodiment, half of the merge operations and the defaulting waiting time are eliminated.

Figure 6C:
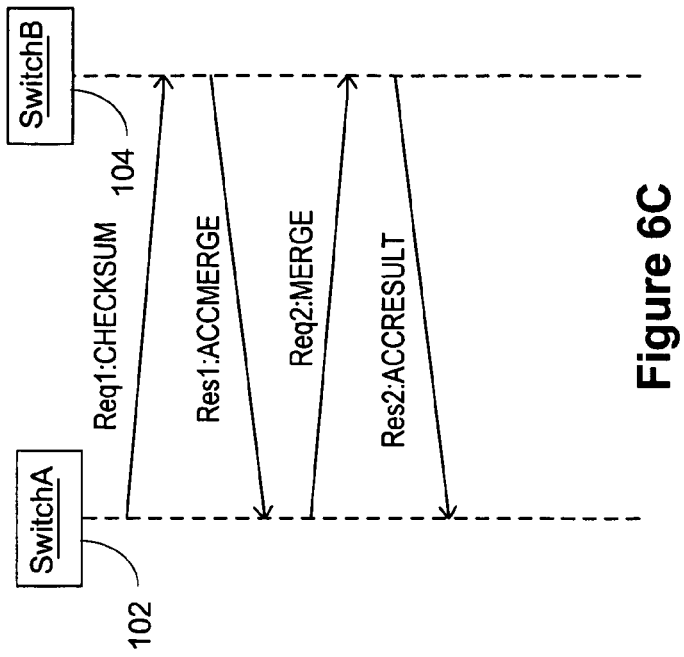
FIGS. 6A, 6B and 6C depict merge exchanges in the scenario as shown in FIG. 1 according to one embodiment of the current invention.
Figure 6A:
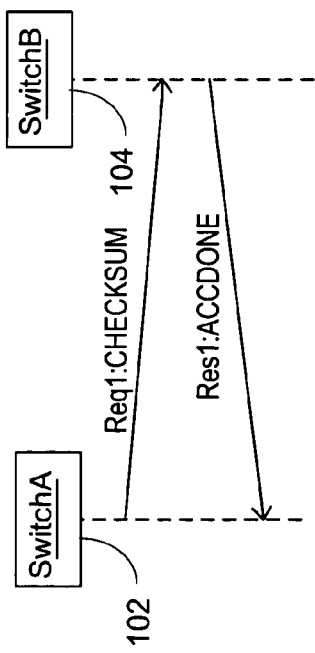

Refer to FIG. 6A. As an example, switchA 102 may initiate the merge operation by sending its checksum to switchB 104. SwitchB 104 compares the checksum from switchA 102 with its own. If they match, then the two switches have the same zone configurations and no merge operation is necessary. SwitchB 104 may respond with an ACCDONE to indicate the end of the merge.

If the checksums do not match, then switchB 104 responds with its configuration cfgB and the checksum. SwitchA 102 performs the merge calculation to get the resulting configuration cfgR and a new checksum for cfgR, and transmits the result to switchB 104. SwitchB 104 can then install the new configuration. SwitchB 104 now has the new configuration cfgR and the new checksum.

In another embodiment as shown in FIG. 6C, if the checksums do not match, then switchB 104 responds with ACC-MERGE, which informs switchA 102 that a merge calculation is necessary. SwitchA 102 sends its configuration cfgA and the checksum to switchB with request MERGE. SwitchB 104 performs the merge calculation to get the resulting configuration cfgR and a new checksum for cfgR. SwitchB 104 now has a new configuration cfgR. SwitchB 104 transmits the result to switchA 102 in ACCRESULT. SwitchA 102 can then install the new configuration. The merger operation ends with both switchA 102 and switchB 104 having the new configuration cfgR and the new checksum.

Referring to FIGS. 3 and 4, similar savings can be achieved according to the embodiment of the current invention. As discussed earlier, for the fabric shown in FIG. 4, there are three merge exchanges between switchA 102 and switchB 104, switchB 104 and switchC 106, switchC 106 and deviceD 108, and a total of six merge calculations using the prior art procedure. According to the embodiment, only three merge calculations are performed, a reduction of 50%. As will be discussed below, according to another embodiment, the number of calculations may be further reduced.

Referring back to the situation shown in FIGS. 1 and 2, the merge computation performs union of the two configurations resulting in cfgR. To achieve a faster merged database installation, each switch usually calculates only $\Delta A = cfgMerge(cfgA, cfgB)$, i.e. elements in cfgB not in cfgA. Similarly, the neighbor, or the other switch, calculates $\Delta B = cfgMerge(cfgB, cfgA)$.

$$\text{Hence, } cfgR = cfgA \cup \Delta A = cfgB \cup \Delta B \qquad (2)$$

Thus, with the prior art implementation, redundant computation exists across the fabric. Take the two switches with a single ISL scenario as an example, as illustrated in FIG. 1. Assume the cfgA on SwitchA 102 and cfgB on switchB 104 are compatible. Assume they are mid-sized configurations: cfgA is 40 k, cfgB is 50 k, and the merge result cfgR is 60 k.

As observed by the inventors in the current invention, calculations of cfgMerge(cfgA,cfgB) and cfgMerge(cfgB,cfgA) are identical procedurally. Both calculations need to traverse the two configurations and find the difference. According to an embodiment of the current invention, deltaA and deltaB are calculated in one shot. In this embodiment, switchA 102 initiates merge operation. SwitchB 104 responds with a NoMatch signal indicating a merge is necessary. SwitchA 102 sends its configuration cfgA to switchB 104. SwitchB 104 performs the merge calculation. After merge happens on switchB 104, switchB 104 responds with deltaA directly, rather than the whole resulting configuration cfgR. After receiving and installing deltaA, switchA 102 has the resulting configuration cfgR. Here, the computation is performed only on switchB 104. Also less Fibre Channel frame traffic is sent, because only the difference is sent back.

In this particular example, using the prior art procedure, the generated traffic is roughly 90 k, i.e. 40 k (cfgA from switchA to switchB)+50 k (cfgB from switchB to switchA) with cfg-Merge. According to the embodiment of the current invention, with cfgMergeNew, the traffic will be only 60 k, i.e. 40 k (cfgA from switchA to switchB)+(60 k−40 k) (deltaA from switchB to switchA). So in this example, the amount of network traffic is reduced by 30 k. The more the overlap between the two configurations, the more the savings.

As will be discussed below, in another embodiment, both deltaA and deltaB are transmitted to the other switch. In that case, the traffic will be only 70 k, i.e. 40 k (cfgA from switchA to switchB)+(60 k−40 k) (deltaA from switchB to switchA)+ (60 k−50 k) (deltaB from switchB to switchA). So in this example, the amount of network traffic is reduced by 20 k. But more savings will be realized in multiple switch networks as will be explained.

According to one embodiment of the current invention, when two switches are linked with multiple Inter-Switch Links (ISLs), only one link needs to be involved in the merge. This way, the merge is done on per-switch basis, rather than per-port basis and the number of merge operations is reduced, sometimes dramatically depending on the number of ISLs. All E_ports are associated with corresponding neighbor switches. Switches may be identified by their World Wide Numbers (WWN). For every neighbor, a principal E_port is selected. In one implementation, the selection may be done during E_port ONLINE. A list of all E_ports may be maintained, such that each E_port has a sequence or priority to become a principal E_port. If an E_port is the first one associated a particular WWN, it is selected as the principal E_port. Only the principal E_port participates in a merge operation. At the end of the merge operation of the principal E_port on the initiator, the status is updated accordingly for all non principal E_ports. Any requests received by non-principal ports will be rejected with LOGICAL_BUSY. If the principal E_port goes down, the next one in the priority list may be designated as the new principal.

With switch-based merge operations, only one merge operation is performed even if there are multiple ISLs between two switches. In the example shown in FIG. 5, according to this embodiment of the current invention, there will be only one merge operation among the four ISLs between the switchA 102 and switchB 104, rather than eight merge operations as in the prior art.

Still referring to the example shown in FIG. 4, it is observed that:

from cfgR=cfgA∪cfgB, we also have cfgR=cfgR∪cfgB or cfgR=cfgR∪cfgA which means, we could predict the merge result of cfgB (or cfgA) and cfgR if cfgR comes from the merge of cfgA and cfgB. Caching last or prior merge results may prevent unnecessary merge exchanges. When switchA 102 joins the fabric, switchB 104 performs the initial merge; caches the merge operation results, and responds to switchA 102. SwitchA 102 may cache or store cfgR (this is always stored in switchA 102, because it is the current configuration of switchA 102 after the merge), deltaA, deltaB, and the checksums associated with cfgA, cfgB and cfgR. SwitchB 104 may cache the same information. Once the merge operation is complete, the prior configurations of switchA 102 and switchB 104, i.e. cfgA and cfgB are no longer needed. If they are ever needed, they can be reconstructed from deltaA, deltaB and cfgR. To save storage space, they are stored separately as individual configurations.

Then switchB 104 sends a cache enhanced checksum request to switchC. From that, switchC 106 knows its configuration, i.e. cfgB, was involved in a previous merge, and switchB 104 has the results for it. So switchC 106 directly asks switchB 104 to send the merge results, i.e. deltaA, deltaB. Hence merge exchanges between switchB 104 and switchC 106 are avoided and switchC gets the results directly. The same thing happens between switchC 106 and deviceD 108. During the whole merge process, only one full merge exchange (between switchA and switchB) is performed. At same time, the merge computation is performed only once in entire fabric.

If a new switch with cfgC joins the fabric, by comparing the checksum associated with cfgC with the checksums associated with cfgA, cfgB and cfgR, one could know if a fresh merge is needed. If the checksum is the same as that associated with cfgA or cfgB, it means that cfgC was involved in a previous merge computation. The merge results of cfgC and cfgR will still be the same as cfgR. In this case, the new switch needs to get the corresponding delta (either deltaA or deltaB) to get the fabric's zoning configuration. If the checksum of cfgC matches that of cfgR, then no merge and zoning installation are needed. If cfgC does not match the cached configurations, then a new merge will be performed and the result will update the current cached contents.

Matching checksums of configurations may provide further optimization. In this case, we may cache only: deltaA, deltaB, checksumA, checksumB, checksumR in order to know if a new merge is needed when a switch joins the fabric.

This embodiment may be further illustrated using a numeric example. If we assume cfgA, cfgB and cfgR are mid-sized zoning configurations e.g.: 40 k, 50 k and 60 k, the network traffic without caching would be: 40 k (switchA send to switchB cfgA)+50 k (switchB send to switchA)+60 k (switchB send cfgR to switchC)+50 k (switchC send to switchB cfgB)+60 k (switchC send cfgR to deviceD)+50 k (deviceD send cfgB back to switchC)=310 k;

The network traffic with caching according to an embodiment of the current invention would be: 40 k (switchA sends to switchB cfgA)+(20 k+10 k) (two deltas in the results)+2× (20 k+10 k) (same results passed from switchB to switchC and from switchC to deviceD)=130 k. This is more than a 50% of reduction in network traffic. Since in most network scenarios, the differences in zone configurations between switches are relatively small, the savings in network traffic are typically much greater than shown in the numeric examples.

To further improve the embodiments described above, a new merge exchange involving cache sensitive requests and responses may be employed. One merge exchange could include multiple requests and responses.

In new merge exchanges, the initiator sends merge requests. Requests can be of type: CHECKSUM, TAKE-CACHEDRESULT or MERGE. The following table describes these requests in detail. Not all components of the listed request content are always included in a particular request. The components included in a request depend on the embodiment implemented. For example, the LocalCachedA and LocalCachedB components are only included if the configuration caching as described above is implemented. DeltaA and DeltaB in the TAKECACHEDRESULT may be included if the partial data transmission is implemented.

TABLE 1

Merge2 Request List

| Name | Description | Contents |
|---|---|---|
| Req1: CHECKSUM | Merge checksum requests with cache information it has. It is compatible with CHECK command for legacy switches. Sender sends cached checksums of all elements involved in the last logical merge. Receiver will match its checksum with the cached checksum and respond to indicate the next step in merge. | Version Number Capability LocalCurrentChecksum: Checksum of merge computation result or checksum of current result if no cache. LocalCachedA: checksum of cached cfgA in last merge. LocalCachedB: checksum of cached cfgB in last merge. |
| TAKECACHEDRESULT | Request to let receiver take cached merge results directly. | Version ChecksumA ChecksumB DeltaA DeltaB |
| MERGE | Merge request, sender sends its current config | Version Local Config |

The response in MERGE2 is multifunctional. Besides normal acknowledgement, the merger response contains control data instructing how further merge steps are to occur. The Responder performs real the merge computation. Response codes are illustrated in Table 2.

TABLE 2

MERGE2 Response List

| Name | Description |
|---|---|
| REJBUSY | Reject with reason busy. |
| REJCANTPERFORM | Reject with reason "can't perform requested operation" |
| ACCDONE | Acknowledgement indicating end of merge session. |
| ACCMERGE | Acknowledgement indicating of need continue merge with (by sending embedded checksum). |
| ACCCACHED | Acknowledgement indicating checksum match. |
| ACCRESULT | Acknowledgement containing resulting configuration. |
| ACCSEGMENT | Acknowledgement requesting segmenting port (conflict). |

Figure 6B:
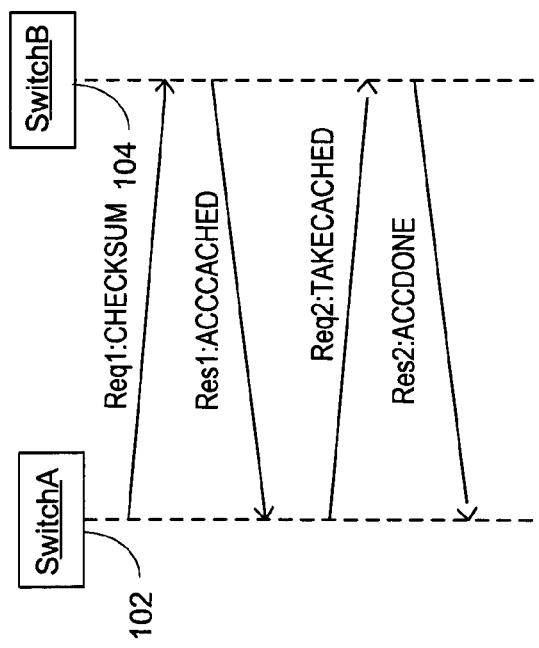

Referring to FIGS. 6A, 6B and 6C, the merge operation according the various embodiments of the current invention may be described in the following basic steps:

First Checksum Exchange:

A merge exchange is initiated by one of the two connecting E_ports (i.e. the merge initiator) sending the CHECK request. The receiver matches the checksum with its own checksum and sends acknowledgement to the initiator. If the receiver matches the remote current checksum, it sends ACCDONE indicating no further merge is needed, as shown in FIG. 6A. If cached checksum matches, it sends back ACCCACHED, see FIG. 6B. If no match is found, ACCMERGE is sent, see FIG. 6C. Receiver then waits for initiator to send its config, as in FIG. 6C.

TAKECACHED Exchange:

If the initiator gets an ACCCACHED response, it sends TAKECACHED. The receiver takes the cached merge result, installs the new configuration and finishes the merge by sending ACCDONE response, as shown in FIG. 6B.

Logical Merge:

On getting an ACCMERGE response the initiator sends MERGE request. The receiver begins the logical merge of the two configs. If they are not compatible, it segments the linked E_ports and sends ACCSEGMENT. Otherwise it updates its own cache and sends ACCRESULT as shown in FIG. 6C. The initiator will take the merge results and the merge session is over. It also updates its cache. Both switches will post BROADCAST events on their other principal E_ports.

When all E_ports reach the merge-done state, the merge is considered to be over.

As illustrated by FIGS. 6A, 6B and 6C, in the merge operation according to embodiments of the current invention, many redundant steps or operations are eliminated from the prior art merge process. Only the initiator of the two connected switch pair initiates the merge operation. The receiver does not initiate the merge operation. When there is a cached configuration available on the receiver/initiator, then only the cached configuration is transmitted, not the whole configuration.

Figure 7:
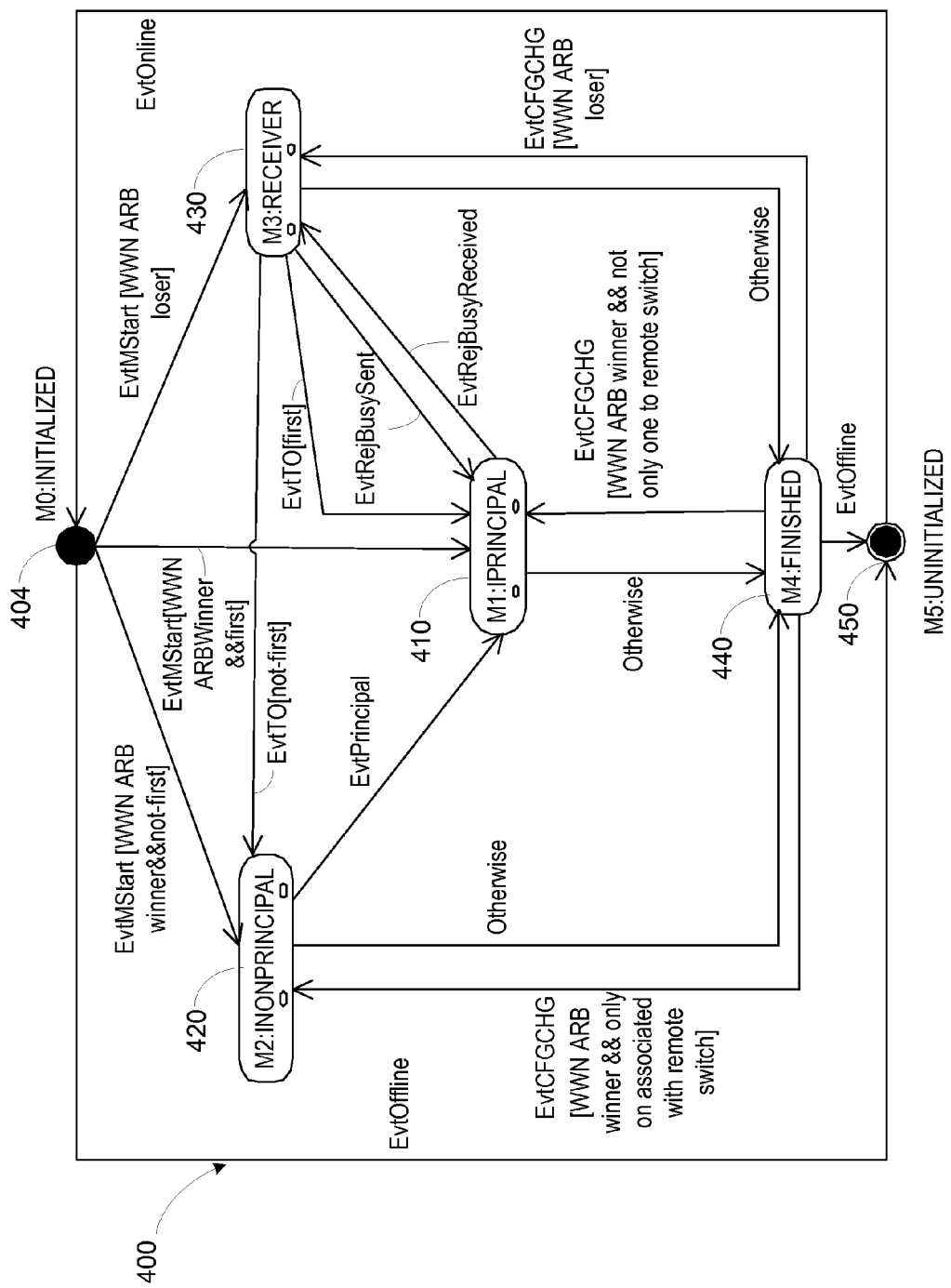
FIG. 7 is a high level state diagram of an embodiment of the current invention.

The various embodiments and their operations may be explained using state diagrams of the event driven state machines. A high level state machine is shown in FIG. 7. The associated states and events that that can cause transitions between various states are shown in Tables 3 and 4. Referring to FIG. 7, an E_port is in a M0 state when it goes online, and it changes to M5 when it goes offline. While doing a merge, if the port is arbitration winner, it will switch to initiator (principal or non-principal), otherwise it will be a receiver (composite state M3). If a port is the first one of the joining neighbor switch and its role is initiator, the composite state is M1. Otherwise the port becomes a non-principal initiator (M2). When the E_port finishes the merge, it will transit to M4 waiting for further events. On receiving a further event, it will transition through appropriate states once again.

TABLE 3

High Level States

| Label | State Name | Description |
|---|---|---|
| M0 | INITIALIZED | Before E_port online. |
| M1 | IPRINCIPAL | Composite state: E_port as principal initiator |

TABLE 3-continued

High Level States

| Label | State Name | Description |
|---|---|---|
| M2 | INONPRINCIPAL | Composite state: E_port as non-principal initiator |
| M3 | RECEIVER | Composite state: E_port as receiver |
| M4 | FINISHED | Merge finished on this port. |
| M5 | UNINITIALIZED | After E_port offline or before E_port online. |

TABLE 4

High Level State Transitions

| Transition (Start:End) | Events (including conditions) |
|---|---|
| M0:M1 | EvtMStart - start merge, port is an arbitration winner, and it is the only one connected with that neighbor switch. |
| M0:M2 | EvtMStart - port is an arbitration winner but not the first one connected with that neighbor switch. |
| M0:M3 | EvtMStart - port is an arbitration loser. |
| M1:M3 | EvtRejBusyReceived - port changes to receiver role. |
| M2:M1 | EvtPrincipal - current principal merge initiator went OFFLINE, next one associated with neighbor becomes principal initiator. |
| M3:M1 (1) | EvtRejBusySent - dispatcher responds to merge request and toggles port role to principal initiator. |
| M3:M1 (2) | EvtTO - after merge on other ports is done and idle time exceeds in receiver role. Port takes over initiator role [This transition is done for principal port only]. |
| M3:M2 | EvtTO - same as M3:M1 (2) except port is not principal. |
| M0:M5 | E_port goes OFFLINE |
| M1:M4 | If none of the above events happens |
| M2:M4 | If none of the above events happens |
| M3:M4 | If none of the above events happens |
| M4:M5 | EvtOffline, E_port went offline. |

Figure 8:
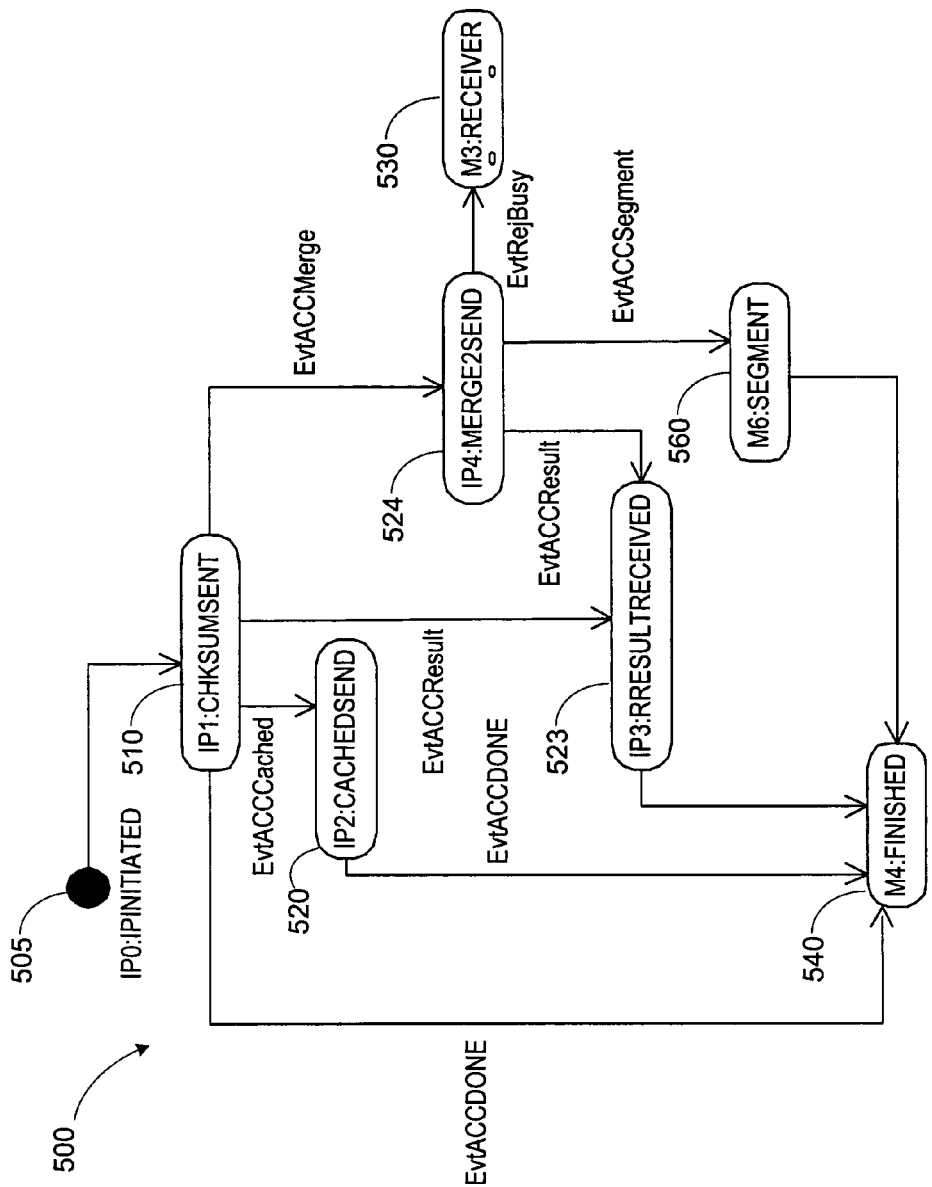
FIG. 8 is a state diagram of a principal initiator.

FIG. 8 shows the state machine of the principal port of a merge Initiator. The associated Tables 5 and 6 show the states and events that cause transitions between the states.

TABLE 5

Principal Initiator States

| Label | State Name | Description |
|---|---|---|
| IP0 | IPINITIALIZED | Initiated as Principal Initiator E_port |
| IP1 | CHKSUMSENT | Sent Checksum request. |
| IP2 | CACHEDSEND | Send cached merge info. |
| IP3 | RRESULTRECEIVED | Remote merge result received. |
| IP4 | MERGE2SENT | MERGE request sent. |
| M6 | SEGMENT | Need to SEGMENT port. |

TABLE 6

Principal Initiator State Transitions

| Transition (Start:End) | Events (including conditions) |
|---|---|
| IP0:IP1 | Always |
| IP1:M4 | Received ACCDONE response for checksum request |
| IP1:IP2 | Received ACCCached response. |
| IP1:IP3 | Received ACCResult response (refer R0:R1 in Table) |
| IP1:IP4 | Received ACCMerge response |
| IP2:M4 | Received ACCDone |
| IP3:M4 | Always |
| IP4:IP3 | Received ACCResult response. |
| IP4:M6 | Received ACCSegment |
| IP4:M3 | Received Reject Busy |

Figure 9:
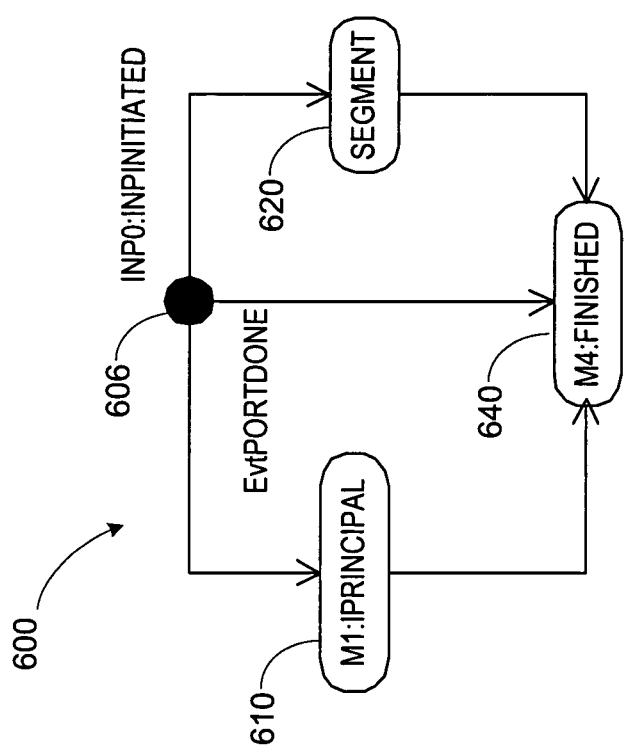
FIG. 9 is a state diagram of a non principal initiator.

FIG. 9 shows the state machine of a non-principal port on an initiator. The associated Tables 7 and 8 lists the relevant states and events.

TABLE 7

Non-Principal Initiator States

| Label | State Name | Description |
|---|---|---|
| INP0 | INPINITIALIZED | Initiated as Non-Principal Initiator E_port |

TABLE 8

Non-Principal Initiator State Transitions

| Transition (Start:End) | Events (including conditions) |
|---|---|
| INP0:M1 | EvtPRINCIPAL - this event is generated when the current principal port goes OFFLINE and the dispatcher selects current one as the new principal. |
| INP1:M4 | EvtPORTDONE - this event is generated when the principal port finishes the merge successfully. |
| INP1:M6 | EvtSEGMENT- this event is generated when the principal port finishes the merge with conflicts. |

Figure 10:
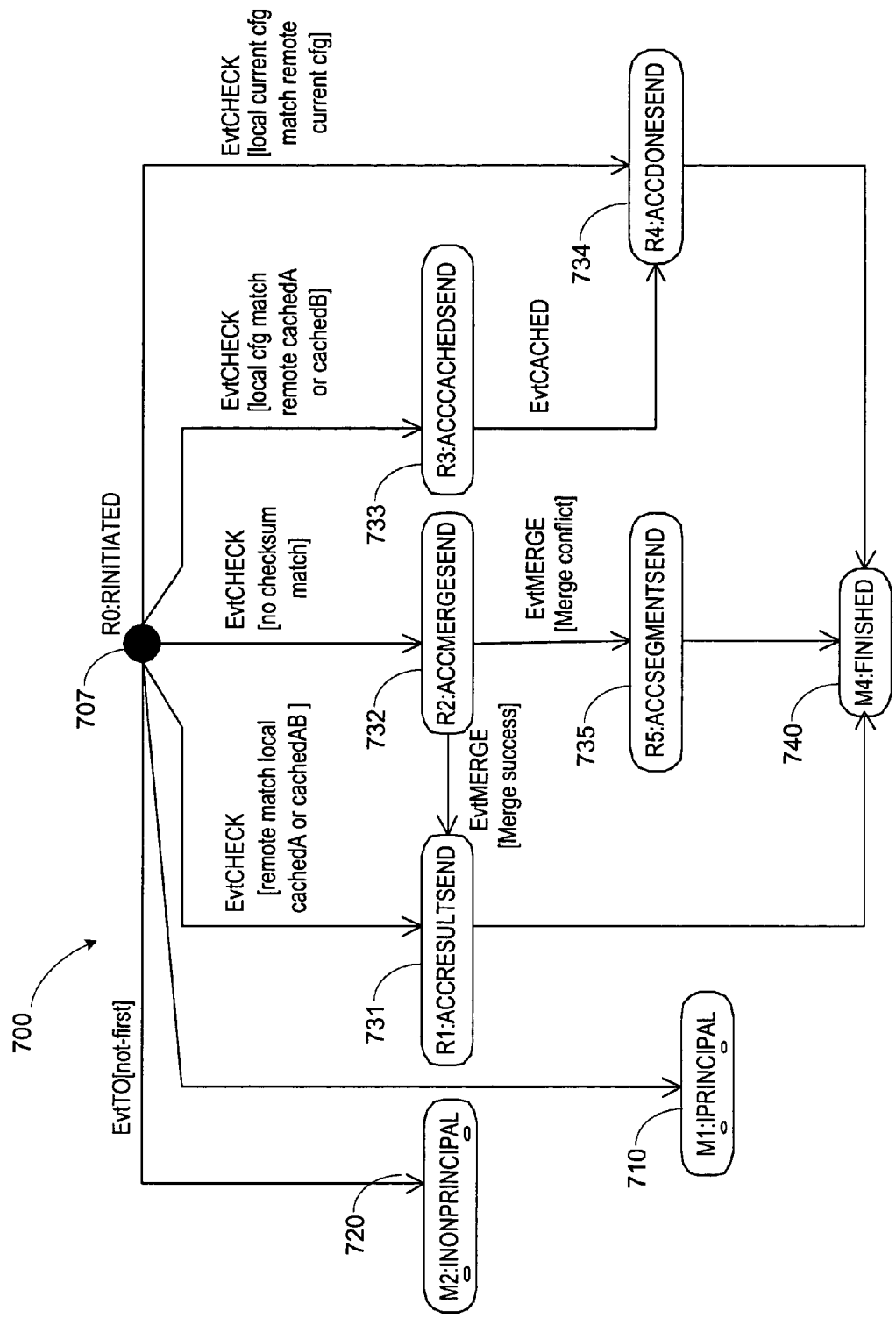
FIG. 10 is a state diagram of a receiver port.

FIG. 10 shows a merge receiver's state machine. The following Tables 9 and 10 list the states and events.

TABLE 9

Receiver States

| Label | State Name | Description |
|---|---|---|
| R0 | RINITIATED | Initialized as receiver. |
| R1 | ACCRESULTSEND | ACCResult response is sent to checksum request (to indicate merge result is cached and the initiator gets merge result directly). |
| R2 | ACCMERGESEND | ACCMerge response to checksum request indicates that a merge is necessary. |
| R3 | ACCCACHEDSEND | ACCCached response indicates that the initiator should send cached results. |
| R4 | ACCDONESENT | ACCDone response indicates that the merge is finished. |
| R5 | ACCSEGMENTSEND | ACCSegment response indicates that the merge resulted in a conflict. |

TABLE 10

Receiver State Transition

| Transition (Start:End) | Events (including conditions) |
|---|---|
| R0:R1 | Received CHECKSUM request, found remote config matches local cached config. Send ACCRESULT with merge results to initiator. |
| R0:R2 | Received CHECKSUM request, found no checksum match, a merge is needed. Sent ACCMERGESEND response to initiator. |
| R0:R3 | Received CHECKSUM request, found local config matches initiator's cached config. Send ACCCACHED to initiator, which sends cached merge result. |
| R0:R4 | Received CHECKSUM request, found configurations are consistent. No merge needed. |
| R2:R5 | Received MERGE request, the merge result is in conflict. Need to segment. Send ACCSEGMENT response to ask initiator to segment the port. |
| R2:R1 | Received MERGE request, merge result is success. Send result over to let initiator take result and install it. |

TABLE 10-continued

Receiver State Transition

| Transition (Start:End) | Events (including conditions) |
|---|---|
| R3:R4 | Received TAKECACHED and sent ACCDONE to indicate merge is over. |
| R4:M4 | Always |
| R5:M4 | Always |
| R1:M4 | Always |
| R0:M2 | Same as M3:M2 |
| R0:M1 | Same as M3:M1 |

Table 11 below further illustrates the benefits of implementing embodiments of the current invention. The benefits include the reduction of merge computation times, the traffic generated by the merge, the merge exchange times and the number of merge retries.

TABLE 11

Performance comparison

| Scenario | Number of times merge computing is performed | | Number of merge exchanges initiated | |
|---|---|---|---|---|
| | According to prior art operation | According to embodiments of current invention | According to prior art operation | According to embodiments of current invention |
| Two Switches Join Together | 2 | 1 | 2 | 1 |
| New switch joins N chained switches | 2 × N | 1 | 2 × N | 1 |
| Core switch joins back to N switch fabric with new config | N + 1 | 1 | 2 × N | 1 |
| New switch joins N switches in a full mesh fabric | Up to N(N + 1) | 1 | Up to N(N + 1) | 1 |

In the above Table 11, for the embodiments according to the current invention column, it is assumed that all of the optimizations described above are active. It is also noted that the values in the last row are for full payload merge exchanges.

When the Fibre Channel network contains only a few switches (i.e. N in the above table is small), the delay and redundant operations due to the merge operation may not be significant, but once the number of switches increases, the deficiency will become significant quickly. As shown in the last row of Table 11, the number of merger operations could be proportional to the second order of the number of switches in the fabric. By employing the embodiments according to the current invention, the overhead operation and delay due to the merge operation are limited and do not increase at all when the number of switches in the network increases. The embodiments according to the current invention make the merge operation much more scalable. The deficiencies discovered by the current invention may not be appreciable when the number of network switches is small or static, as in many current networks. But when the number increases and/or the topology of the network changes frequently, the network overhead and delay caused by such deficiencies can increase dramatically. Such increase in overhead may overwhelm the entire network. By implementing the embodiments of the current invention, those deficiencies can be preempted. Therefore, the current invention greatly improves zone merge operation in a network. The current invention makes a network more robust for changes and/or expansions.

Figure 5:
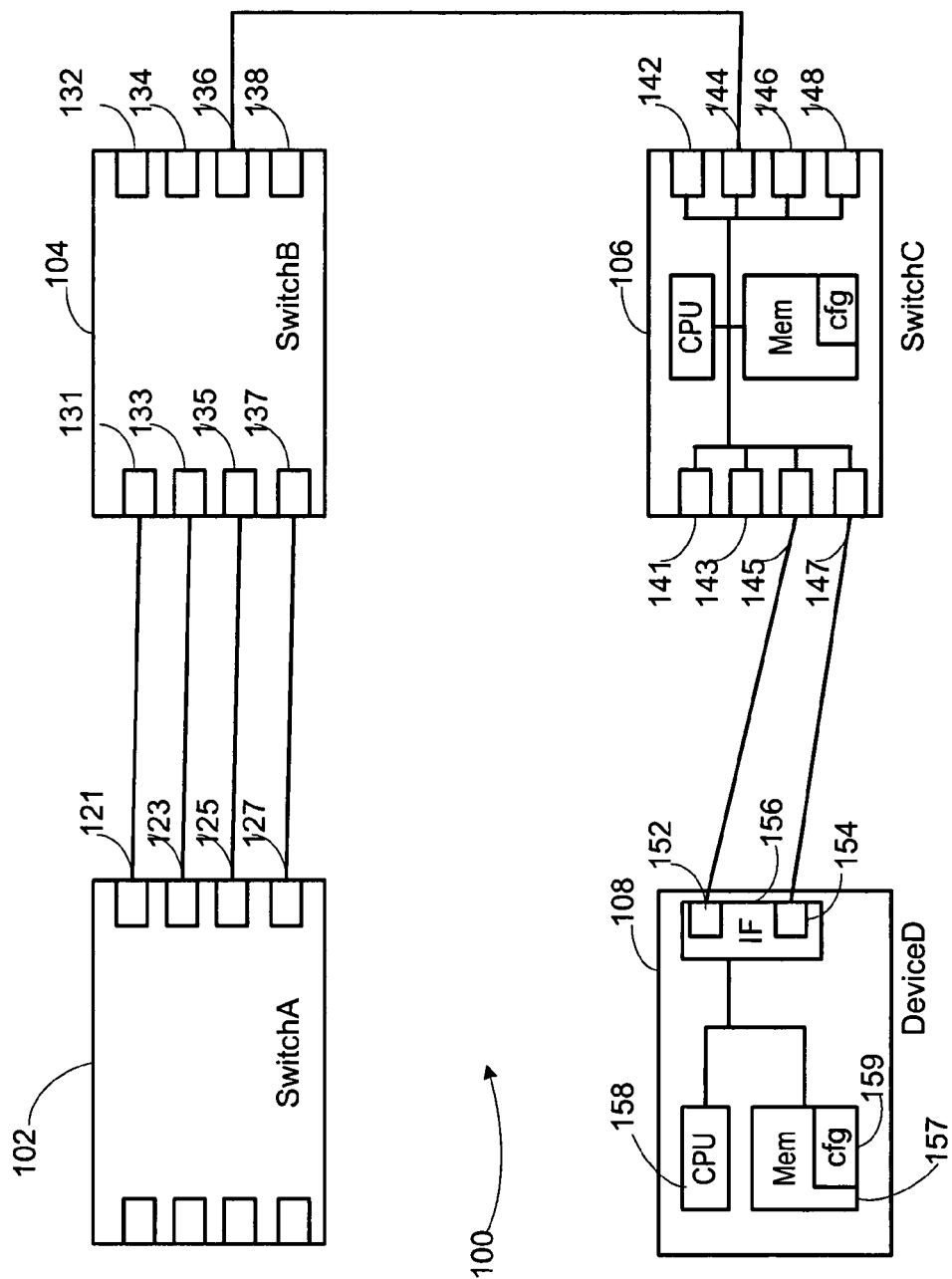
FIG. 5 depicts more details regarding port connections in a multiple-port connection network as shown in FIG. 4.

The above description of the embodiments of the current invention is focused on switches and ports within such switches, but the invention is applicable to any other network devices, as long as they are capable to communicate with other devices within the network. The device only needs to have a network interface to connect to another network device or a fabric. The deviceD 108 in FIG. 5 shows the minimum necessary components in a network device to take advantage of the current invention. The device has a control module 158 to control, manage the network communication. The control module has access to a memory module 157 to store the device related information, such as zoning configuration 159, past zone merge operations etc. When the device D 108 is connected to a fabric and needs to update its zone configuration with the rest of the fabric, it can go through the procedure as described above. The device D 108 may be an independent network device, or a component of a larger entity, such as a port on a switch.

The above description and examples are discussed using Fibre Channel networks. But the current invention is not limited to such networks. The current invention may be applied in any networks that incorporate zoning concepts and need to update the zoning configurations when the network topology changes. The current invention makes zoning configuration updates very efficient and very scalable.

While illustrative embodiments of the invention have been illustrated and described, it will be appreciated that various changes can be made therein without departing from the spirit and scope of the invention.

We claim:

1. A method comprising:
   connecting a first port on a first switch to a second port on a second switch and forming a first inter-switch link;
   connecting a third port on the first switch to a fourth port on the second switch and forming a second inter-switch link;
   designating one inter-switch link as the principal inter-switch link and the remaining inter-switch link as a non-principal inter-switch link based on a unique port property, wherein the two ports in the principal inter-switch link are the principal ports and the two ports in the non-principal inter-switch link are the non-principal ports; and
   the principal inter-switch link performing a merge operation resulting in an updated configuration and the non-principal inter-switch link never performing a merge operation.

2. The method of claim 1, wherein the principal inter-switch link designation is based on the timing of connection and wherein the two ports connected first are the principal ports and the resulting inter-switch link is the principal inter-switch link.

3. The method of claim 1, further comprising the two principal ports sharing the updated configuration with the non-principal ports.

4. A network switch comprising:
   a plurality of ports, wherein at least two ports are operable to connect to at least two ports on a second switch to form at least two inter-switch links; and
   a control module coupled to the plurality of ports,
   wherein the control module is operable to arbitrate based on a unique property of the inter-switch links to determine one inter-switch link as a principal inter-switchlink, wherein the port in the principal inter-switch link is the principal port, and the remaining inter-switch links as non-principal inter-switch-links, wherein the ports in the non-principal inter-switch links are non-principal ports; and wherein the control module is operable to perform merge operations through the principal port and to not perform merge operations through the non-principal ports.

5. The network switch of claim 4, wherein the principal inter-switch link designation is based on the timing of connection and wherein the port connected first is the principal port and the resulting inter-switch link is the principal inter-switch link.

6. The network switch of claim 4, further comprising the principal port sharing an updated configuration resulting from merge operations with the non-principal ports.

7. A method comprising:
   determining in a first network switch that a first port is the initial port to receive an indication from a second network switch;
   designating in the first network switch the first port as a principal port;
   determining in the first network switch that a second port is not the initial port to receive an indication from the second network switch;
   designating in the first network switch the second port as a non-principal port; and
   performing, by the first network, switch merge operations using the principal port and never using the non-principal port.

8. The method of claim 7, wherein the indication from the second network switch is the worldwide name of the second switch.

9. A network switch comprising:
   a control module configured to:
      determine that a first port is the initial port to receive an indication from a second network switch;
      designate the first port as a principal port;
      determine that a second port is not the initial port to receive an indication from the second network switch;
      designate the second port as a non-principal port; and
      perform switch merge operations using the principal port and not the non-principal port.

10. The network switch of claim 9, wherein the indication from the second network switch is the worldwide name of the second switch.

* * * * *